United States Patent [19]

Reedy et al.

[11] 4,223,960
[45] Sep. 23, 1980

[54] AUTOMATIC TRANSMISSION

[75] Inventors: Lonnie T. Reedy; Eddie Smith, both of Freeport, Tex.

[73] Assignee: Reedy and Smith, Inc., Lake Jackson, Tex.

[21] Appl. No.: 920,185

[22] Filed: Jun. 29, 1978

Related U.S. Application Data

[63] Continuation of Ser. No. 692,432, Jun. 3, 1976, Pat. No. 4,098,382.

[51] Int. Cl.³ .............................................. F16C 33/66
[52] U.S. Cl. .................................... 308/78; 308/168; 308/135; 308/240
[58] Field of Search ..................... 308/78, 37, 135, 9, 308/168, 110, 113, 106, 240

[56] References Cited

U.S. PATENT DOCUMENTS

| | | | |
|---|---|---|---|
| 1,070,240 | 8/1913 | Ferrall | 308/113 |
| 1,485,985 | 3/1924 | Jones | 308/78 |
| 3,993,370 | 11/1976 | Woollenweber | 308/240 |
| 4,090,743 | 5/1978 | Suzuki et al. | 308/240 |
| 4,098,382 | 7/1978 | Reedy et al. | 408/202 |

*Primary Examiner*—Lenard A. Footland

[57] ABSTRACT

Increased resistance to excessive wear rate is provided in certain automobile automatic transmissions by providing a combination thrust-washer/radial-bushing at a certain position on the oil pump stator where the customarily manufactured transmission is provided only with a thrust-washer. The combination thrust-washer/-radial-bushing provides bearing surfaces for the direct clutch drum to revolve against in both the lateral and radial directions.

3 Claims, 6 Drawing Figures

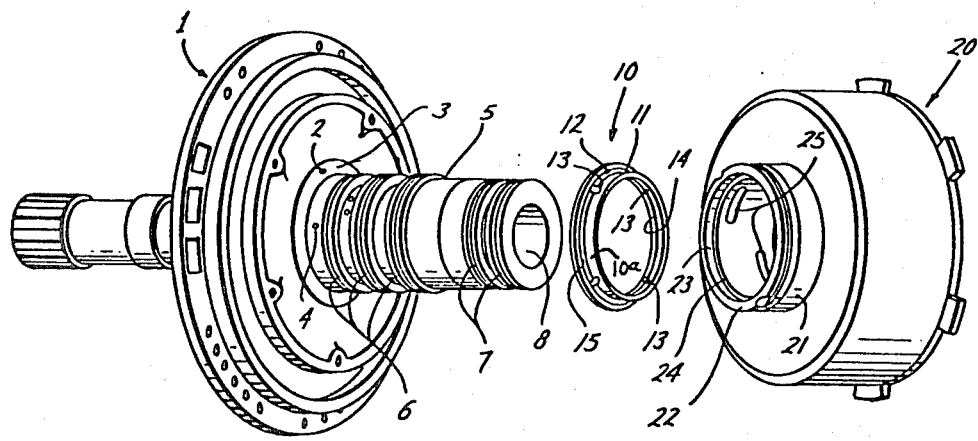
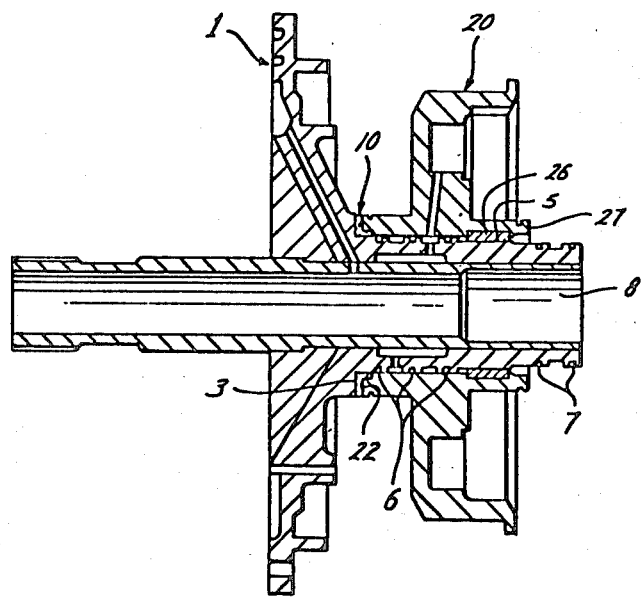
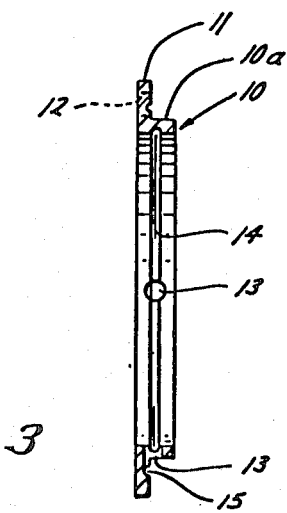

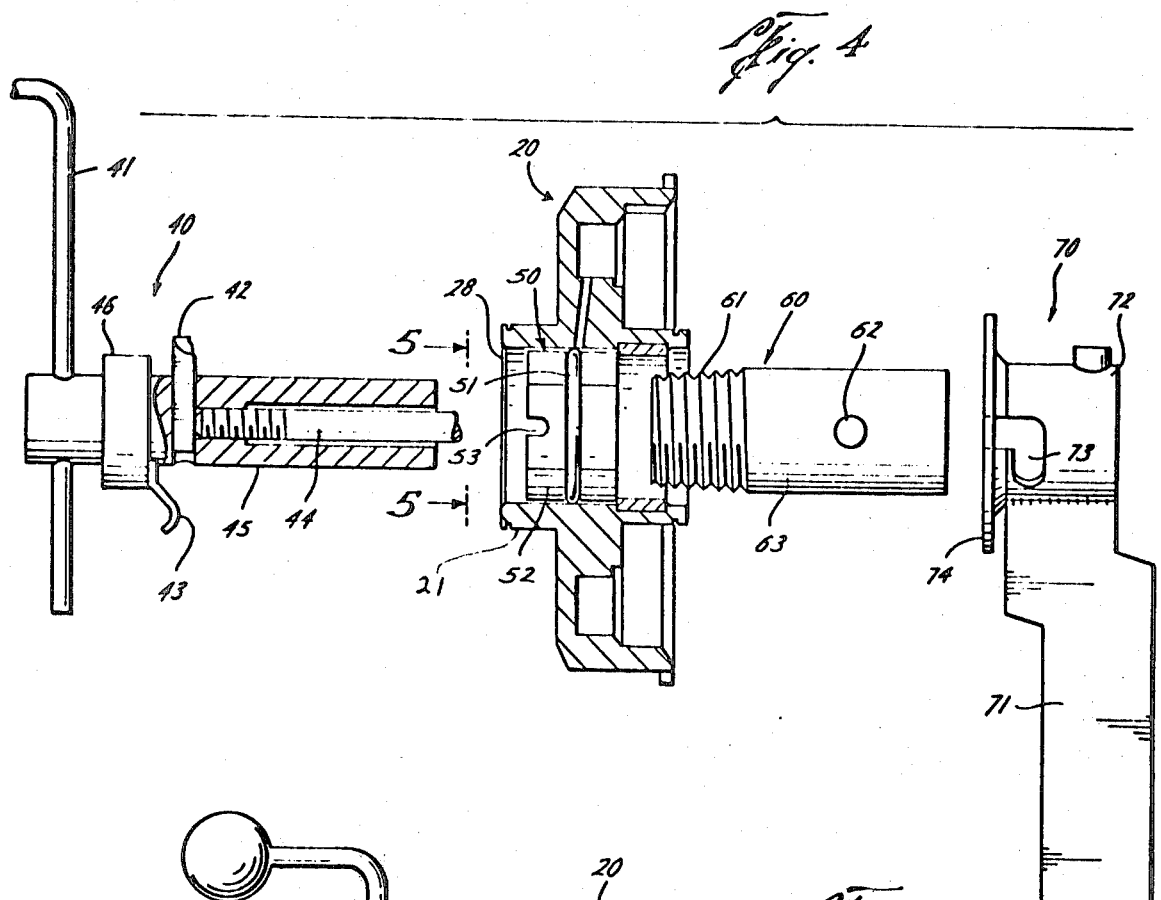
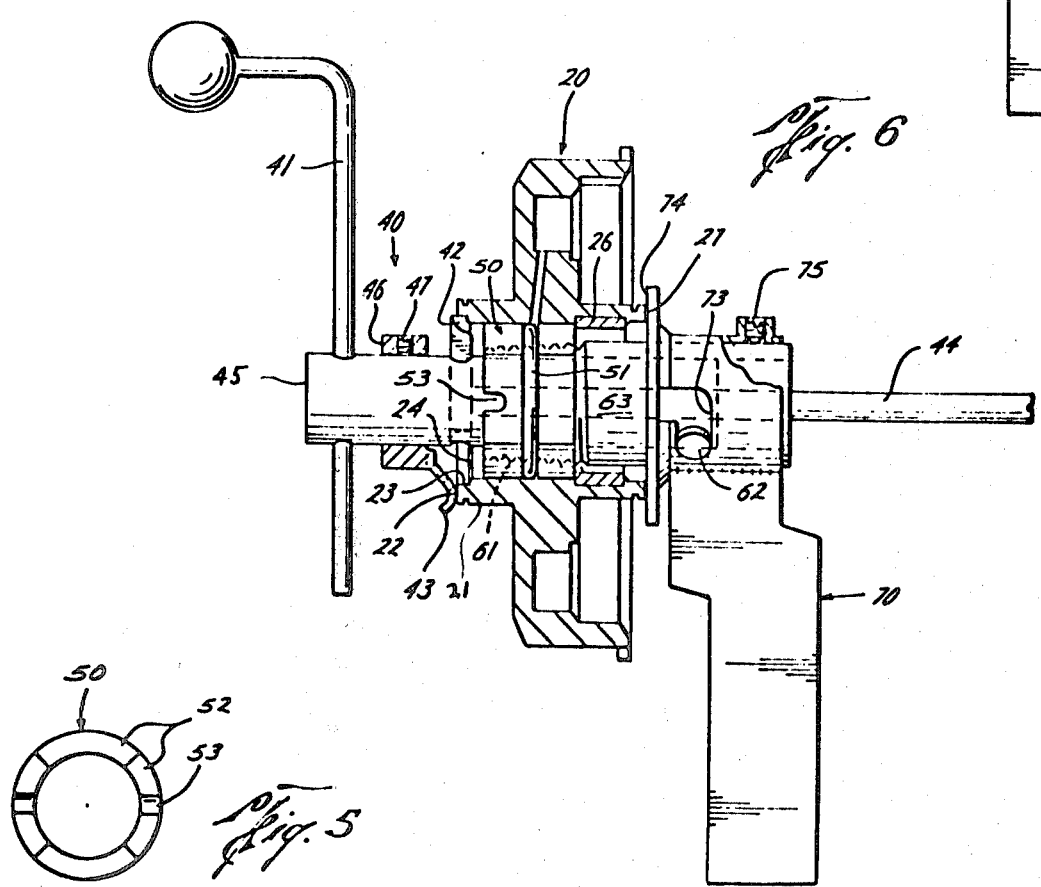

AUTOMATIC TRANSMISSION

CROSS-REFERENCE TO RELATED APPLICATIONS

This is a continuation of Ser. No. 692,432 filed June 3, 1976 now U.S. Pat. No. 4,098,382.

BACKGROUND OF THE INVENTION

There are certain automobile automatic transmissions which are manufactured with a thrust-washer encircling the oil pump stator shaft which protrudes through, and is an integral part of, the pump cover in the oil pump assembly. The thrust-washer is located on the pump stator shaft on the rear side of the pump cover which is the side distal(rearward) from the engine. The stator shaft on the side of the pump cover on said distal side is several inches in length and is provided with the said thrust-washer followed by oil seal rings located sequentially in separate parallel radial grooves encircling the stator. Following that is a bearing surface encircling the stator and following that there are more oil seal rings. Onto this stator shift the direct clutch drum is positioned so that the stator shaft, carrying the oil seal rings and bearing surface, is snugly enclosed within the inner circumference of the direct clutch drum. The inner circumference of the direct clutch drum (which we shall also call a "rotor") has a surface which is prepared as a bearing surface and which aligns with the bearing surface which encircles the stator shaft. When assembled, the frontal portion of the direct clutch drum, which is cylindrical in appearance and which protrudes through the main body of the direct clutch drum, is rotatable around the stator shaft and the frictional forces are carried radially by the bearing and laterally by the thrust-washer.

Since the direct clutch drum is subjected to high rpm speeds, it is necessary that there be a steady flow of oil to the bearing surfaces, to the surfaces in contact with the thrust-washer, to the oil seal rings and to the other parts which form the remainder of the oil pump assembly and the clutch drum. The oil is supplied by the oil pump assembly and is forced at high pressure through channels within the walls of the stator shaft and through small holes or ports to the areas between the stator shaft and the rotor.

A common cause of transmission failure is the wearing of the thrust-washer which allows lateral "play" or looseness in the fast turning rotor. This "play" becomes a "wobble" and the customary bearing surface is rapidly worn away. This wobbling of the clutch drum also causes rapid wearing of the oil seal rings and also causes excessive wear of the stator shaft in the area of the thrust-washer. Wearing of the inside periphery of the rotor can also occur. This wearing away causes loss of oil pressure, needed to operate the clutches, and this results in overheating. The overheated oil tends to vaporize and lose its ability to lubricate and the oil rings often become "heat-welded" to the stator, thus causing excessive wear, and even gouging, of the inner circumference of the rotor. Furthermore, the loss of oil pressure and the overheating causes damage to other parts of the transmission. The cost of overhauling such a damaged transmission and replacing the damaged parts often runs into the hundreds of dollars.

Various attempts have been made by manufacturers of the transmissions to improve the wear rate of the thrust-washers, and have even tried using "needle-washers" which are assembled much like small bar-bearings positioned in a plane parallel to, and between, two flat washer surfaces. Repair kits have been sold which employ "shims" to take up the slack in the thrust direction of supplementing the thickness of the thrust-washer. These attempts to improve the wear rate in the area of the thrust washer have been, in the long run, substantially ineffective.

The transmissions which are improved by the present invention are, e.g., of the type known as Turbo Hydramatic 250 and 350. Also Ford-o-Matic C-4 and other similar transmissions while differeing slightly in the manner in which the stator and the rotor are designed, still suffer from essentially the same kind of wear at a similar thrust washer, and are also improved by applying the concept and features of the present invention.

It is an object of the present invention to improve the wear-rate of the automatic transmissions known as Turbo Hydra-Matic 250 and 350 and Ford-o-Matic C-4 and others which have similar stator shaft/rotor assemblies.

It is another object to improve the wear-rate at the union of the stator shaft and rotor of said transmissions.

Another object is to provide a radial-bushing around the stator shaft on which the rotor turns and which is juxtapositioned with the thrust-washer; the radial bushing supplements the existing bearing on which the rotor turns.

Still another object is to improve the manufacture of said transmissins by modifying the stator to receive a radial-bushing encircling its frontal outer circumference, juxtapositioned with the thrust-washer when the transmission is assembled.

Yet another object is to provide a combination thrust-washer and radial-bushing for use with modified existing stator shaft/rotor assemblies.

A still further object is to provide tooling specially designed to allow easy modification of existing rotor designs so as to enable the existing rotor designs to receive the radial-bushing of the present invention.

These and other objects are attained by the present invention which is described and illustrated herein.

SUMMARY OF THE INVENTION

In accordance with the present invention certain automobile automatic transmissions (identified hereinafter) are improved in their ability to resist wear by providing a load-bearing radial-bushing encircling the stator shaft and within the inner surface of the frontal end of the rotor at a location which is juxtapositioned with the thrust-washer. The thrust-washer encircles the stator shaft immediately behind the pump cover, through which the stator shaft protrudes at a central position, and provides a bearing surface for receiving the lateral thrust of the rotor as it rotates. The load-bearing radial-bushing provides a radial bearing surface for the frontal portion of the inner circumference of the rotor. The terms "stator shaft," "rotor," "thrust-washer," "radial-bushing," and other terms used herein will be better understood from the attached drawings and the detailed description which follows.

FIG. 1 depicts an expanded view, generally, of a pump cover and stator shaft assembly (1) in a left oblique perspective, a combination thrust-washer and radial-bushing (10) in a left-oblique perspective, and a direct clutch drum (20) in a right-oblique perpsective.

FIG. 2 depicts, generally, a cross-sectional view of the pump cover and stator shaft assembly (1), the combination thrust-washer and radial-bushing (10), and the direct clutch drum (20) in assembled form.

FIG. 3 depicts a cross-sectional view of the combination thrust-washer and radial-bushing (10) whereby important features are shown in greater detail than in FIGS. 1 and 2. The dimensions in FIG. 3 more closely approximate the true dimensions of the combination thrust-washer and radial-bushing than the view of (10) in FIGS. 1 and 2. It has the general appearance and configuration of a short cylinder having a flanged end.

FIG. 4 depicts an expanded view, generally, of a cutting tool (40), a direct clutch drum (20), a cutting-tool centering device (50), shown disposed within drum (20), a threaded spreader device (60) for screwing into, and tightening of, said centering device (50) in said drum (20) and a tool-mounting device (70) for securing said spreader device (60) in a stable position during operation of said cutting tool (40).

FIG. 5 depicts a frontal view, generally, of the cutting-tool centering device (50).

FIG. 6 depicts, generally, the parts of the expanded view (FIG. 4) as assembled and at the finish of the cutting operation.

The drawings do not depict the many other parts of the transmissions, nor do the drawings depict all possible embodiments of the invention. The drawings are not to exact scale, but substantially depict relative dimensions of the parts in combination.

As used herein, the expression "lateral" is used to describe the thrust force having a direction which is parallel to the axis of the rotor and "radial" is used to describe the forces having vector directions which are normal (i.e., at right angles) to the axis of the rotor. The term "rotor" is used to describe that portion of the direct clutch drum through which the stator shaft extends when the transmission is assembled. The term "stator shaft" is the commonly accepted name of the part around which the direct clutch drum revolves.

DETAILED DESCRIPTION OF THE INVENTION

In FIG. 1, the pump cover and stator shaft assembly (1) has oil ring grooves (6) encircling the stator shaft. Following that is bearing surface (5) encircling the stator shaft. Following that are more oil ring grooves (7) near the distal end of the stator shaft. By "distal end" it is meant the end extending rearwardly away from the engine. The stator shaft is hollow (8) for its entire length. On the rear face of the pump cover there is a surface (3) against which the thrust-washer normally is placed and against which the combination thrust-washer and radial-bushing (10) will be placed when installed. A protruding pin (2) is depicted on surface (3) which fits into pin-hole (12) on the combination thrust-washer and radial-bushing (10) when it is installed. This helps hold the bushing (10) in place during installation and prevents it from revolving around the stator shaft when the transmission is in operation. Alternate means for securing the bushing (10) may be employed; for example, a protruding key on bushing (10) which fits into a key-slot juxtapositioned to surface (3) may be employed. There are oil holes on the external surface of the stator shaft which communicate with oil channels built within the wall of the hollow stator shaft; these channels are not shown on the drawing. For purposes of describing the present invention only oil hole (4) is indicated as it must communicate with oil-groove (14) on the inside periphery of bushing (10).

Also in FIG. 1, the combination thrust-washer and radial-bushing (10) is characterized as having a thrust-washer portion (11) and a radial-bushing portion (10a). An oil groove (14) encircles the inside periphery of portion (10a) and an oil groove (15) encircles the distal surface of the thrust-washer portion (11). In each case, the oil grooves shown as (14) and (15) are located substantially midway of the surfaces on which they are located. A hole (12) through thrust-washer portion (11) will receive pin (2) when the bushing (10) is placed in position on the stator shaft against surface (3). Also, when installed in place oil groove (14) will communicate with oil hole (4). Oil passageways (13) communicate from oil groove (14) to oil groove (15). The perspective of (10) in FIG. 1 depicts four such passageways (13), but the number is not critical. The purpose of passageways (13) is to direct some of the pressurized oil from oil hole (4) which flows into oil groove (14) to reach bushing surface (10a) and to flow into oil groove (15); it is possible to employ only one such oil hole (13), but a plurality of two or more holes is preferred. The oil reaching bushing surface (10a) and oil groove (15) provides lubrication for the thrust-washer portion and radial-bushing portions against which the snugly-fitting surfaces (22) and (23) of the direct clutch drum (20) will revolve when in operation in a transmission.

Also in FIG. 1, direct clutch drum (20) is shown to have a cylindrically-shaped center portion extending toward the stator shaft (1) which is called, in this disclosure, a rotor (21). The rotor (21) is seen to have a frontal face surface (22), and an inside reamed-out surface (23) which surface has a greater radial distance from the center axis of rotor (21) than does the adjacent inner surface of the cylindrical rotor through which oil holes (25) communicate. There is a bevelled edge (24) where the inner surface of the rotor (21) meets the reamed-out portion of which surface (23) is a part. When the direct clutch drum (20) is assembled onto the stator shaft (1), the radial-bushing surface (10a) supplies a bearing surface against which surface (23) revolves. Ordinarily surfaces (23) and (10a) are aligned parallel to the axis of the revolving direct clutch drum (20), but if bushing surface (10a) is slanted from such parallel alignment, then surface (23) must also be slanted in order that the two surfaces will match together to get good bearing wear-rates. The drawings do not depict a bearing surface (23) of a different metal than drum (20), but it will be obvious to practitioners of the pertinent art that a bushing material can be inserted into the rotor (21) at surface (23) if desired. It is desirable that the radial-bushing (10a) have a thickness great enough that it not be easily damaged or deformed during normal handling and installation and in order that it not wear out quickly. It is also desirable that the rotor (21) not be reamed out, in order to get surface (23), to such an extent that the thickness of the wall of the rotor be unduly weakened by being made too thin. In any event the thickness of the radial-bushing and the reamed-out portion of the rotor should be correlated carefully in order that the bearing surfaces be snugly fitted, but without binding. A very close tolerance, taking into account the thin coating of oil which will flow across bearing surface (10a) is desirable. Machining to the proper tolerance range is within the skill of machinists.

The bevelled edge (24) inside rotor (21) is helpful in assembling the rotor when the oil rings are in position in oil grooves (6) and (7). In assembling parts (1), (10), and (20), part (10) is slid onto the stator shaft and held in place by pin (2). Then the oil rings (6) and (7) are installed on the stator shaft. These oil rings fit tightly inside the rotor when the rotor is in position, so if the bevelled edge (24) is not employed, it is difficult to slip the rotor past the oil rings.

In actual assembly of a complete transmission there are numerous other parts which will be installed along with the pump cover and stator shaft (1) and the direct clutch drum (20), but since such installation of other parts is not affected by the present invention, there is no need to discuss the other parts in this disclosure.

FIG. 2 is a cross-sectional view depicting, in general, an assembly of the pump cover and stator shaft (1), the combination thrust-washing and radial-bushing (10) and the direct clutch drum (20). The figure demonstrates that part (10) is in position on the stator shaft against surface (3) and that drum (20) is in position against the bushing part (10) with surface (22) being against the thrust-washer portion (11). Surface (23) is in position against bushing surface (10a). Oil rings (6) are in position within rotor (21). In this figure there is shown a bearing surface (26) which is inside rotor (21) and is in position against the bearing surface (5) of the stator shaft; this bearing surface (26) is not in view in the perspective drawing of drum (20) in FIG. 1. Note that bearing surface (26) is near the distal end of rotor (21). In customarily manufactured transmissions, this bearing surface (26) is often the sole bearing surface designed to carry the radial forces of the drum as it revolves at high speed. This generally is not a sufficient amount of bearing surface for such rigorous surface, especially since the bearing is near one end of the rotor. Efforts to control the "wobble" at the frontal portion of the rotor by the use of thrust-washers does not, in many cases, provide sufficient durability.

The present invention, which provides a radial-bushing (10a) in the frontal portion of the rotor (21), in addition to the thrust-washer, improves the wear rate of such transmissions by providing protection against "wobble" of the rotor which normally accompanies normal wear of the bearing surfaces (26) and (5).

FIG. 3 is an enlarged, cross-sectional view of the combination thrust-washer and radial-bushing (10) which is shown in perspective in FIG. 1. The oil grooves (14) and (15) and oil holes (13) are more clearly depicted. Also the location of pin-hole (12) is more clearly shown. These radial-bushings are preferably made of a durable material, e.g., bronze or other copper alloy, which is different from the cast ferrous metal from which the stator and rotor are made. Babbitt metal may be employed, if desired. Other means for providing for oil flow on the surfaces of the thrust-washer and radial-bushing will be apparent to those of skill in the relevant arts.

FIG. 4 depicts a cutting tool (40), a centering device (50), said centering device (50) being positioned within the rotor (21) of direct clutch drum (20). Also shown is a threaded spreader device (60) and a tool-mounting device (70). Cutting tool (40) has a handle (41) for rotating the cutting bit (42) made of suitable metal, a depth-setting stop device (43) which is used to regulate the depth to which the cutting bit (42) can travel, an adjustable collar (46) encircling the shaft (45) to which handle (41) is attached, the collar (46) being held in position by a set-screw (as seen in FIG. 6), a threaded rod (44) extending into a hollowed-out cylindrical portion of shaft (45), said hollowed-out portion extending into shaft (45) until it reaches the cutting bit (42). The cutting bit (42) is inserted into a hole extending through shaft (45) and is adjustable as to how far it protrudes from shaft (45) and is held securely at its desired setting by the threaded rod (44) which is screwed into threads provided therefor within the hollowed-out portion of shaft (45). The cutting-tool centering device (50) depicted in FIG. 4 (and in FIGS. 5 and 6) is a self-centering assembly of elongate arc segments (52) held together by a rubber O-ring (51). The centering device (51) is conveniently provided with notches (53) for receiving the prongs of a two-pronged spanner wrench which can be used in tightening the centering device (50) onto the tapered threads of spreader device (60). As the spreader device screws into the centering device (50), which has threads inside the arc segments, the arc segments spread apart until they fit tightly inside the rotor (21). This tightly fitted centering device, premachined so that its cylindrical shape is concentric with the axis of the rotor, provides a means for guiding the cutting tool as the reaming of the rotor is done. The spreader device (60) has a pin (62) protruding from the main body (63). Body (63) is of a length sufficient to protrude from the distal end of rotor (21) in order that the spreader device (60) can be fitting into a holding device or tool-mounting device (70). Pin (62) is located on the spreader device in a convenient location for insertion into a pin-slot (73) which is a part of the tool-mounting device (70). In one actual embodiment there is another pin (62) located on the other side of the main body (63) of the spreader device (60), but this second pin is not depicted in the drawings. Such second pin requires that there be a second pin-slot (73) on the other side of mounting device (70) which is not in view.

FIG. 5 depicts an end view of the centering device (50) and shows four arc segments (52) defining a cylindrical shape. Two notches (53) are depicted; these are end views of notches (53) as depicted in FIG. 4. The The rubber O-ring (51) of FIG. 4 is not in view in FIG. 5.

FIG. 6 depicts the cutting tool (40), in operable combination with the centering device (50) which has been spread into place by the threaded spreader-device (60). The centering device is positioned inside the rotor (21) and is tightly fitted therein by the action of the spreader device (60) which has been screwed into the centering-device. Furthermore in FIG. 6 it is shown that the main body (63) of the spreader device (60) is positioned in the mounting device (70) with pin (62) being inserted into L-shaped pin-slot (73) and turned into position. Set screw (75) helps hold body (63) securely in the mounting device (70). Note that the mounting device (70) has a flanged face (74) which fits snugly against surface (27) of rotor (21). Thus, when assembled, rotor (21) is securely held with respect to the centering device (50), the spreader device (60), and the mounting device (70). Mounting device (70) is conveniently provided with a strong, flat protrusion or arm (71) which can be tightly held in a vise or other convenient holding apparatus.

Also in FIG. 6 it is shown that the cutting tool (40) is positioned in place by having shaft (45) inserted through centering device (50) with rod (44) extending on through and beyond mounting device (70). The cutting bit (42) is shown in position at the end of its cutting chore, with the stop device (43) resting against the frontal face surface (22) of rotor (20). In actual practice it is preferred to have the cutting bit (42)

shaped so as to provide bevelled edge (24) at the same time it provides surface (23).

The present invention contemplates the use of a compressed helical spring (not shown in the drawings) for exerting a pulling force on rod (44). Referring to FIG. 6, the compressed spring is slid onto rod (44) and is fastened at the distal end thereof by a pin, clip, screw or other suitable means. The compressed spring pushes against the distal end of spreader device (60) which protrudes through mounting device (70). This forces cutting bit (42) against surface (22) of rotor (21) so that when handle (41) is turned, cutting bit (42) reams out a portion of the inside wall of rotor (21), thereby creating the desired new surface (23). When the desired depth of the cut is reached, the stop device (43) comes to rest against surface (22). Means other than such compressed spring may be employed for forcing cutting bit (42) against surface (22), such as the use of positive pressure against the frontal end of tool (40).

The use of a specially designed reaming tool such as is depicted in FIGS. 4 and 6 is an important feature conducive to the wide-spread adaptation of the present invention. There are a large number of transmission repair shops which would be enabled to modify existing direct clutch drums for receiving the radial bushing (10) of the present invention by the use of a tool specially designed for that purpose and easy to operate. Very few of such repair shops would be expected to own suitable power latches for preforming such modifications to the direct clutch drum; it would add to the expense of modifying or repairing transmissions if the repairman must take the lathe work to a machinist. The cutting tool (40), which may be considered a hand-operated lathe, may be built inexpensively and could be employed many times; only the cutting bit (42) has a substantially limited life and, depending on the tool quality of the metal from which it is made, may need to be replaced or re-sharpened after several cuts.

It can be seen then from the foregoing description and explanation that the present invention involves method and means for improving the wear-rate of certain transmissions. The improvement comprises providing a radial-bushing on the stator shaft around which the rotor of the direct clutch drum revolves, said radial-bushing being juxtapositioned with a thrust-washer at a place on the stator at which customarily manufactured transmissions have only a thrust-washer; the improvement also comprises modification of the direct clutch drum by reaming out a portion of the rotor of the drum so as to receive the radial-bushing, a specially designed cutting tool being provided for that purpose. The present invention also contemplates a modification kit of materials for the practice of the present invention, said kit comprising a cutting tool (40), a centering device (50) for proper position of said cutting tool (40), a spreader device (60) for positioning said centering device (50) securely within the rotor of the direct clutch drum, a mounting device (70) for securely mounting the direct clutch drum in operable combination with the centering device and the spreader device, and optionally, one or more combination thrust-washer and radial-bushings (10).

The transmissions which are improved by the present invention are of the kind which have a direct clutch drum revolving around a stator shaft and which are customarily provided wih a radial-bearing surface only at, or near, the distal end of the inner surface of the rotor of said drum, the revolving rotor having only a thrust-washer as a bearing surface at the frontal end of said rotor when installed on said stator shaft.

The present invention also contemplates modifying such transmissions for, or during, the manufacture thereof so as to provide a radial-bushing juxtapositioned with a thrust-washer at the frontal end of the rotor of the direct clutch drum, the radial-bushing providing a radial bearing for the rotor to supplement the customarily provided radial bearing near the distal end of said rotor, the thrust-washer supplying a bearing surface for the frontal end face of said rotor for receiving the thrust forces which are parallel to the axis of the rotor.

Terminology used for various customary parts described herein is consistent with that which is used in, e.g., *Motor's Automatic Transmission Manual,* 5th Edition, 1973, published by the Hearst Corporation. In that manual see, in particular, pages 601–603 for illustrations of a direct clutch drum and a pump cover and stator shaft assembly.

Persons skilled in the arts pertaining to the present invention will be able, having learned of this invention, to determine alternate embodiments to those disclosed here without departing from the spirit and scope of the present invention. The embodiments herein are to illustrate the invention and its various parts; the scope of the invention is limited by the claims, not by the particular embodiments described.

We claim:

1. A combination thrust-washer/radial-bushing having the configuration of a short cylinder with a flanged end, said short cylinder being the radial-bushing portion and said flanged end being the thrust-washer portion, said radial-bushing having an oil-conveying groove inscribed around its inner periphery and having at least one oil passageway communicating with its outer periphery, and said thrust-washer portion having an oil-conveying groove inscribed around the surface which faces the radial-bushing.

2. The combination thrust-washer/radial-bushing of claim 1 wherein there are a plurality of oil passageways communicating between the inner periphery and the outer periphery of the radial-bushing.

3. The combination thrust-washer/radial-bushing of claim 1 wherein there is at least one oil passageway communicating between the outer periphery of the radial-bushing and the oil-conveying groove inscribed around the face of the thrust-washer.

\* \* \* \* \*